United States Patent [19]

Oishi et al.

[11] Patent Number: 6,107,389
[45] Date of Patent: Aug. 22, 2000

[54] RUBBER COMPOSITION FOR VIBRATION ISOLATING LAMINATE BODY

[75] Inventors: Hideyuki Oishi; Akio Murakoshi, both of Hiratsuka, Japan

[73] Assignee: The Yokohama Rubber Co., Ltd., Tokyo, Japan

[21] Appl. No.: 09/147,110

[22] PCT Filed: May 1, 1997

[86] PCT No.: PCT/JP97/01503

§ 371 Date: Oct. 8, 1998

§ 102(e) Date: Oct. 8, 1998

[87] PCT Pub. No.: WO97/42265

PCT Pub. Date: Nov. 13, 1997

[30] Foreign Application Priority Data

May 9, 1996 [JP] Japan ...................................... 8-114660

[51] Int. Cl.$^7$ ....................................................... C08K 3/04
[52] U.S. Cl. ................................................................ 524/495
[58] Field of Search ..................................... 524/575, 495

[56] References Cited

U.S. PATENT DOCUMENTS

| | | | |
|---|---|---|---|
| 4,452,960 | 6/1984 | Throckmorton | 526/201 |
| 4,592,550 | 6/1986 | Horiuchi | 273/61 |
| 4,824,899 | 4/1989 | Yasuda | 524/496 |
| 5,247,009 | 9/1993 | Kitahara | 524/552 |
| 5,299,615 | 4/1994 | Ataka | 152/454 |

*Primary Examiner*—Paul R. Michl
*Attorney, Agent, or Firm*—Nikaido Marmelstein Murray & Oram, LLP

[57] ABSTRACT

A rubber composition for base isolation laminates, comprising a natural rubber and/or an isoprene rubber, a polybutadiene rubber composite, a petroleum resin and fine particulate carbon black.

2 Claims, 1 Drawing Sheet

RUBBER COMPOSITION FOR VIBRATION ISOLATING LAMINATE BODY

TECHNICAL FIELD

The present invention relates to a rubber composition for base isolation laminates which can efficiently absorb vibration energy and is excellent in long-term endurance.

BACKGROUND ART

Various equipment for absorbing vibrational energy such as vibration isolators, vibration dampers or seismic isolators have recently been spread rapidly. Further, rubber compositions exhibiting a damping power (absorbing power) against vibrational energy are used in such equipment.

As means for imparting excellent damping characteristics to a rubber material, i.e., obtaining a rubber composition having excellent damping characteristics, it has been a common practice to add a large amount of carbon black or a petroleum resin to a rubber.

However, the addition of a large amount of carbon black had disadvantages in that the resulting composition was poor in processability in refining and that the resulting seismic isolator was poor in shear failure characteristics, though the resulting composition exhibited an enhanced damping capacity (i.e., an enhanced hysteresis loss). On the other hand, the addition of a large amount of a petroleum resin had a disadvantage in that the resulting rubber composition exhibited lowered creep characteristics and was poor in long-term endurance, though the composition was improved in damping characteristics.

DISCLOSURE OF INVENTION

The present invention aims at providing a rubber composition for base isolation laminates which is excellent in vibrational energy absorbing properties and long-term endurance.

In order to attain this aim, the rubber composition for base isolation laminates according to the present invention is characterized by comprising 100 parts by weight of a rubber component comprising 90 to 50 parts by weight of a natural rubber and/or an isoprene rubber and 10 to 50 parts by weight of a polybutadiene rubber composite, 15 to 60 parts by weight of a petroleum resin and 50 to 90 parts by weight of fine particulate carbon black, the polybutadiene rubber composite comprising 97 to 80% by weight of a cis-1,4-polybutadiene rubber having a cis-1,4-linkage content of 90% or above and 3 to 20% by weight of a syndiotactic 1,2-polybutadiene.

Such a combination of a natural rubber (NR) and/or an isoprene rubber (IR) with a polybutadiene rubber composite (BR composite), a petroleum resin and fine particulate carbon black makes it possible to obtain a rubber composition improved in vibrational energy absorbing properties and long-term endurance.

BEST MODE FOR CARRYING OUT THE INVENTION

Figure 1:
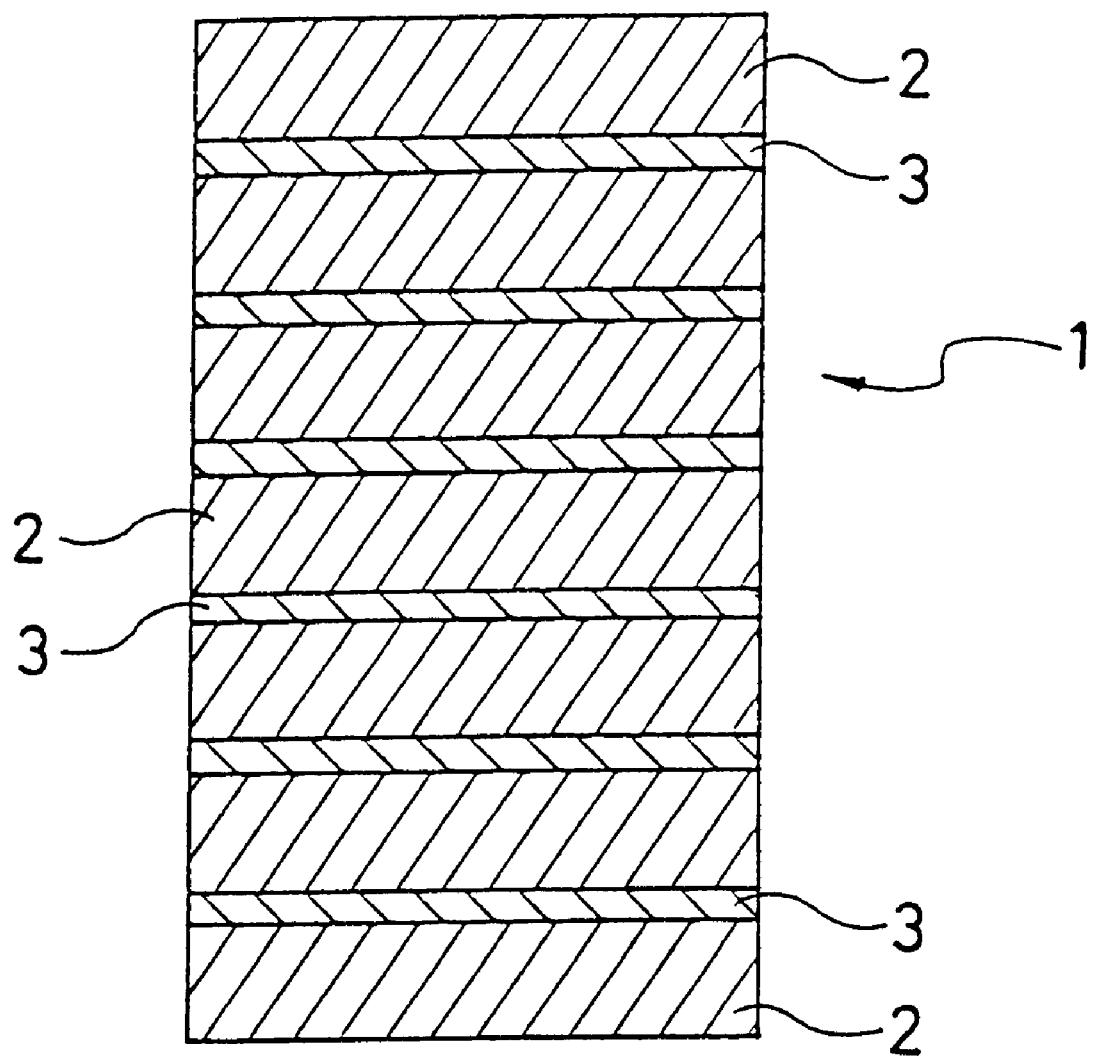
FIG. 1 is a sectional view illustrating an example of the base isolation laminate.

In FIG. 1, a base isolation laminate 1 has a structure wherein a plurality of sheets of a rubber composition 2 are laminated with rigid hard plates 3 (e.g., steel sheets) sandwiched among the sheets.

The rubber composition of the present invention comprising a natural rubber (NR) and/or an isoprene rubber (IR), a polybutadiene rubber composite (BR composite), a petroleum resin and fine particulate carbon black is used as the rubber composition 2 shown in FIG. 1.

In the present invention, 100 parts by weight of a rubber component comprising 90 to 50 parts by weight of NR and/or IR and 10 to 50 parts by weight of the BR composite is blended with 15 to 60 parts by weight of a petroleum resin and 50 to 90 parts by weight of fine particulate carbon black.

When the amount of NR and/or IR added exceeds 90 parts by weight, the resulting rubber composition will be poor in elongation, while when it is less than 50 parts by weight, the composition will be poor in processability and damping capacity. The term "NR and/or IR" used in this description refers to the use of either NR or IR or that of both NR and IR.

The polybutadiene rubber composite (BR composite) comprises 97 to 80% by weight of a cis-1,4-polybutadiene rubber having a cis-1,4-linkage content of 90% or above and 3 to 20% by weight of a syndiotactic (syn) 1,2-polybutadiene. The BR composition is commercially available, for example, under the trade name of "UBEPOL-VCR" from Ube Industries, Ltd.

The term "petroleum resin" refers to a resin prepared by distilling a product of thermal cracking of petroleum naphtha to obtain a $C_9$–$C_{10}$ fraction containing polymerizable components such as indene and α-methylstyrene and subjecting this fraction to cationic polymerization. Such a resin is commercially available under the trade name of "FTR" (from Mitsui Petrochemical Industries, Ltd.), "Hiresin" (from Toho Chemical Industry Co., Ltd.), "Cumarone resin" (from Nippon Steel Chemical Co., Ltd.) or the like.

In the present invention, 15 to 60 parts by weight of a petroleum resin is blended with 100 parts by weight of the rubber component. When the amount of the petroleum resin is less than 15 parts by weight, the resulting composition will be poor in vibrational energy absorbing capacity, while when it exceeds 60 parts by weight, the composition will be poor in long-term endurance owing to its significant creep.

The fine particulate carbon black to be used in the present invention is one having a nitrogen specific surface area of 60 to 150 $m^2/g$ (preferably 80 to 150 $m^2/g$) and a DBP absorption of 60 to 160 $cm^2/100$ g (preferably 90 to 160 $cm^2/100$ g). Such a carbon black is commercially available as an HAF-, ISAF- or SAF-type one according to ASTM.

In order to obtain a rubber composition exhibiting an absorbing power against vibrational energy, it is essential to add such a carbon black. The amount of the carbon black to be added is 50 to 90 parts by weight per 100 parts by weight of the rubber component. When the amount is less than 50 parts by weight, the resulting composition will be poor in the absorbing capacity against vibrational energy, while when it exceeds 90 parts by weight, the processability in preparing the rubber composition will be so poor as to give a rubber composition lowered in strengths.

In preparing the rubber composition of the present invention, a vulcanization acceleration such as N-t-butyl-2-benzothiazolylsulfenamide and a vulcanization auxiliary such as zinc oxide or stearic acid may be added to an unvulcanized rubber in proper amounts for the purpose of the vulcanization of the rubber.

FIG. 1 shows an example of the base isolation laminate wherein the rubber composition of the present invention is used. As shown in FIG. 1, the base isolation laminate is constituted of sheets of the rubber composition 2 and hard plates 3 (such as general structural steel sheets or cold rolled steel sheets) which are alternately laminated. The base isolation laminate can be produced by molding and vulcanizing an unvulcanized rubber composition to obtain vulcanized rubber sheets and bonding the sheets to the hard plates with an adhesive. Alternatively, it can be produced by molding an unvulcanized rubber composition into sheets, laminating the sheets and the hard plates and heating the resulting laminate to conduct the vulcanization and bonding of the laminate simultaneously.

The base isolation laminate according to the present invention is useful as the support of a road bridge or the foundation support of a building.

EXAMPLES AND COMPARATIVE EXAMPLES

Rubber compositions were prepared according to the formulations (parts by weight) specified in Table 2 (Examples 1 to 6 and Comparative Examples 1 to 5). The compositions were evaluated for tensile strength ($T_B$), elongation at break ($E_B$) and JIS A hardness ($H_S$) according to the methods which will be described. As shown in FIG. 1, base isolation laminates (135 mm×135 mm×74 mm) were each produced by alternately laminating sheets of each rubber composition and steel sheets, and evaluated for equivalent damping constant (h), compressive creep (%) and shear failure characteristics (%). The results are given in Table 2.

Tensile Strength ($T_B$, kgf/cm²)

The tensile strength of each rubber composition was determined according to JIS K 6301. A larger value means a higher strength and lower liability to break.

Elongation at Break ($E_B$, %)

The elongation at break of each rubber composition was determined according to JIS K 6301.

Equivalent Damping Constant (h)

The equivalent damping constant of each base isolation laminate was determined by the use of a biaxial shear testing machine at 0.1 Hz and a strain of 175%.

A high-damping rubber support to be used as the seismic isolator of a bridge is required to exhibit such an energy absorbing power during earthquake as to attain a damping constant expected in the design of the bridge. The correction factors of design horizontal seismic coefficients based on the damping constants of bridges are stipulated in "Design Manual of Base Isolation for Road Bridges" (Ministry of Construction, Public Works Research Center (foundation)), which is a basic design guide of base isolation. They are as given in Table 1.

TABLE 1

|  | Damping const. of bridge | Correction factor |
|---|---|---|
| Seismic coefficient method | h < 0.1 | 1.0 |
|  | h ≧ 0.1 | 0.9 |

TABLE 1-continued

|  | Damping const. of bridge | Correction factor |
|---|---|---|
| Horizontal load-carrying capacity method | h < 0.1 | 1.0 |
|  | 0.1 ≦ h < 0.12 | 0.9 |
|  | 0.12 ≦ h < 0.15 | 0.8 |
|  | h ≧ 0.15 | 0.7 |

Since the equivalent damping constant of a high-damping rubber support tends to lower with increasing shear strain, it is appropriate that the damping constant of a bridge as expected on the level of the load-carrying capacity method is 0.12 to 0.15. In order to satisfy this appropriate damping constant, the equivalent damping constant of a high-damping rubber support on the level of strain of an object must be about 0.13 or above.

Compressive Creep (%)

A creep which will occur during the design durable period was calculated from the formula (1) based on the vertical displacement of a seismic isolator as caused by applying a vertical load corresponding to a design bearing stress of 60 kgf/cm² at +20° C. for 1000 hours.

$$\delta_{CR} = at^b \quad (1)$$

wherein $\delta_{CR}$: creep (mm) of a seismic isolator t: design durable period (h) of a bridge a, b: creep constants calculated by the equations (2) and (3):

$$a = (\delta_{100})^2/(\delta_{1000})^2 \quad (2)$$

$$b = \log(\delta_{1000}/\delta_{100}) \quad (3)$$

$\delta_{100}$: vertical displacement (mm) of a seismic isolator after 100 hours $\delta_{1000}$: vertical displacement (mm) of a seismic isolator after 1000 hours It is necessary that the creep which will occur during the design durable period of a bridge is at most 5% of the total thickness of the rubber as calculated by the above formula (1).

Shear Failure Characteristics (%)

The shear modulus of each base isolation laminate was determined by applying a shear load to the laminate in the vertical direction at a rate of 0.5 mm/sec by the use of a biaxial shear testing machine under a load of 60 kgf/cm² to determine the shear modulus at break. It is suitable that the base isolation laminate has a shear modulus of 400% or above.

TABLE 2

|  | Target Value | Comp. Ex. 1 | Comp. Ex. 2 | Ex. 1 | Ex. 2 | Ex. 3 | Ex. 4 | Ex. 5 | Comp. Ex. 3 | Comp. Ex. 4 | Ex. 6 | Comp. Ex. 5 |
|---|---|---|---|---|---|---|---|---|---|---|---|---|
| NR |  | 100 | 70 | 90 | 70 | 50 | 70 | 70 | 70 | 70 | 70 | 70 |
| BR |  |  | 30 |  |  |  |  |  |  |  |  |  |
| VCR*1 |  |  |  | 10 | 30 | 50 | 30 | 30 | 30 | 30 | 30 | 30 |
| carbon black (ISAF) |  | 85 | 85 | 85 | 85 | 85 | 85 | 85 | 85 | 85 | 60 | 40 |
| petroleum resin (cumarone resin) |  | 35 | 35 | 35 | 35 | 35 | 20 | 45 | 10 | 65 | 35 | 35 |
| zinc oxide |  | 5.0 | 5.0 | 5.0 | 5.0 | 5.0 | 5.0 | 5.0 | 5.0 | 5.0 | 5.0 | 5.0 |
| stearic acid |  | 1.0 | 1.0 | 1.0 | 1.0 | 1.0 | 1.0 | 1.0 | 1.0 | 1.0 | 1.0 | 1.0 |
| age resister |  | 3.0 | 3.0 | 3.0 | 3.0 | 3.0 | 3.0 | 3.0 | 3.0 | 3.0 | 3.0 | 3.0 |
| sulfur |  | 2.1 | 2.1 | 2.1 | 2.1 | 2.1 | 2.1 | 2.1 | 2.1 | 2.1 | 2.1 | 2.1 |
| vulcanization accelerator CZ |  | 1.2 | 1.2 | 1.2 | 1.2 | 1.2 | 1.2 | 1.2 | 1.2 | 1.2 | 1.2 | 1.2 |

TABLE 2-continued

| | Target Value | Comp. Ex. 1 | Comp. Ex. 2 | Ex. 1 | Ex. 2 | Ex. 3 | Ex. 4 | Ex. 5 | Comp. Ex. 3 | Comp. Ex. 4 | Ex. 6 | Comp. Ex. 5 |
|---|---|---|---|---|---|---|---|---|---|---|---|---|
| Basic Physical Properties: | | | | | | | | | | | | |
| $T_B$ (kgf/cm$^2$) | | 223 | 190 | 198 | 195 | 196 | 213 | 183 | 225 | 154 | 216 | 213 |
| $E_B$ (%) | | 340 | 510 | 470 | 450 | 450 | 410 | 530 | 360 | 650 | 550 | 580 |
| $H_S$ (JIS-A) | | 85 | 81 | 85 | 84 | 84 | 82 | 85 | 80 | 87 | 80 | 72 |
| Characteristics as Seismic Isolator: | | | | | | | | | | | | |
| h | $\geq 0.13$ | 0.14 | 0.12 | 0.14 | 0.14 | 0.135 | 0.13 | 0.145 | 0.125 | 0.155 | 0.13 | 0.115 |
| compressive creep (%) | $\leq 5\%$ | 1.8 | 2 | 2.1 | 2.3 | 2.5 | 1.8 | 3.3 | 1.7 | 5.2 | 1.9 | 1.5 |
| shear failure characteristic (%) | $\geq 400\%$ | 370 | 450 | 430 | 430 | 420 | 410 | 450 | 400 | 480 | 460 | 470 |

Note:
*[1]VCR 412 (a product of Ube Industries, Ltd.), comprising cis-1,4-polybutadiene and syndiotactic 1,2-polybutadiene at a weight ratio of 88 to 12 and having a Mooney viscosity ($ML_{1+4}$ (100° C.)) of 45.

As apparent from the results given in Table 2, the composition of Comparative Example 1 which contained only a natural rubber (NR) as the rubber component was poor in shear failure characteristics, while the composition of Comparative Example 2 which contained a natural rubber (NR) and a butadiene rubber (BR) as the rubber component, that of Comparative Example 3 which contained the petroleum resin in too small an amount and that of Comparative Example 5 which contained carbon black in too small an amount exhibited low equivalent damping constants (h) respectively and were poor in vibrational energy absorbing properties. Further, the composition of Comparative Example 4 which contained the petroleum resin in too large an amount exhibited such a high compressive creep (e) as to be poor in long-term endurance. Thus, it can be understood that the rubber compositions of Examples 1 to 6 according to the present invention are superior to those of Comparative Examples 1 to 5 in vibrational energy absorbing properties and long-term endurance.

As described above, the rubber composition for base isolation laminates according to the present invention comprises 100 parts by weight of a rubber component comprising 90 to 50 parts by weight of a natural rubber and/or an isoprene rubber and 10 to 50 parts by weight of a polybutadiene rubber composite, 15 to 60 parts by weight of a petroleum resin and 50 to 90 parts by weight of fine particulate carbon black, the polybutadiene rubber composite comprising 97 to 80% by weight of a cis-1,4-polybutadiene rubber having a cis-1,4-linkage content of 90% or above and 3 to 20% by weight of a syndiotactic 1,2-polybutadiene. By virtue of this constitution, the rubber composition is excellent in vibrational energy absorbing properties and long-term endurance.

What is claimed is:

1. A rubber composition for base isolation laminates, which rubber composition comprises
   (1) 100 parts by weight of a rubber component comprising
      (a) 90 to 50 parts by weight of a natural rubber and/or an isoprene rubber, and
      (b) 10 to 50 parts by weight of a polybutadiene rubber composite,
   (2) 15 to 60 parts by weight of a petroleum resin and
   (3) 50 to 90 parts by weight of fine particulate carbon black,
   wherein the polybutadiene rubber composite comprises
      (i) 97 to 80% by weight of a cis-1,4-polybutadiene rubber having a cis-1,4-linkage content of at least 90% and
      (ii) 3 to 20% by weight of a syndiotactic 1,2-polybutadiene.

2. The rubber composition for base isolation laminates as set forth in claim 1, wherein the fine particulate carbon black has a nitrogen specific surface area of 60 to 150 m$^2$/g and a DBP absorption of 60 to 160 cm$^3$/100 g.

* * * * *